C. LOMBARDO.
NOODLE CUTTER.
APPLICATION FILED SEPT. 18, 1914.

1,195,486.

Patented Aug. 22, 1916.

Witnesses:
M. A. Newcomb
J. A. Reid

Inventor:
Charles Lombardo
by his Attorney

UNITED STATES PATENT OFFICE.

CHARLES LOMBARDO, OF WATERFORD, NEW JERSEY.

NOODLE-CUTTER.

1,195,486.  Specification of Letters Patent.  Patented Aug. 22, 1916.

Application filed September 18, 1914. Serial No. 862,296.

*To all whom it may concern:*

Be it known that I, CHARLES LOMBARDO, a subject of the King of Italy, residing at Waterford, in the county of Camden and State of New Jersey, have invented certain new and useful Improvements in Noodle-Cutters, of which the following is a specification.

This invention relates to implements designed to cut thin sheets of dough into narrow strips or ribbons, and commonly known as noodle cutters.

One object of my invention is to provide an implement of this type with a plurality of gangs of cutters, the blades of each gang being spaced apart differently from those of the other gangs.

A further object of the invention is to provide an implement having a plurality of gangs of cutters with a stripper comb for each gang and a stripper apron common to all.

A further object of the invention is to provide an implement of this type with means to lock any one of the gangs of cutters in operative position, or to release the same to move another gang into operative position and lock it.

With these objects in view, my invention consists in novel features of construction which will be described in detail in the following specification and claimed in the closing clauses.

Figure 1:
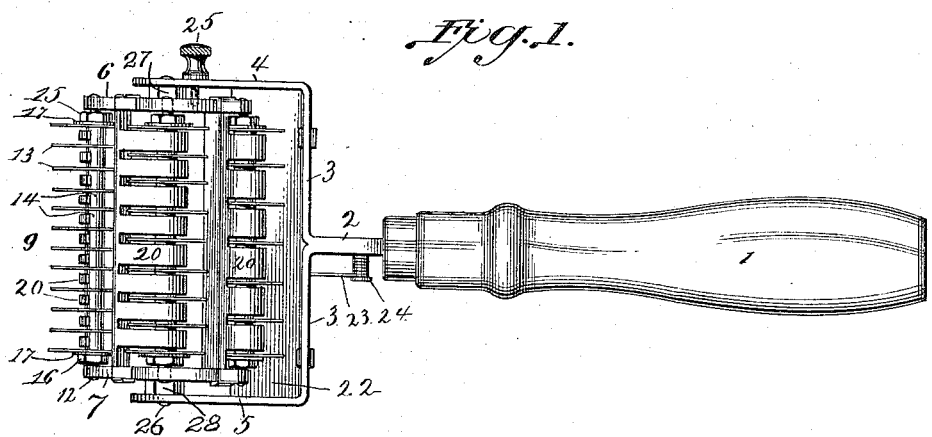
Figure 2:
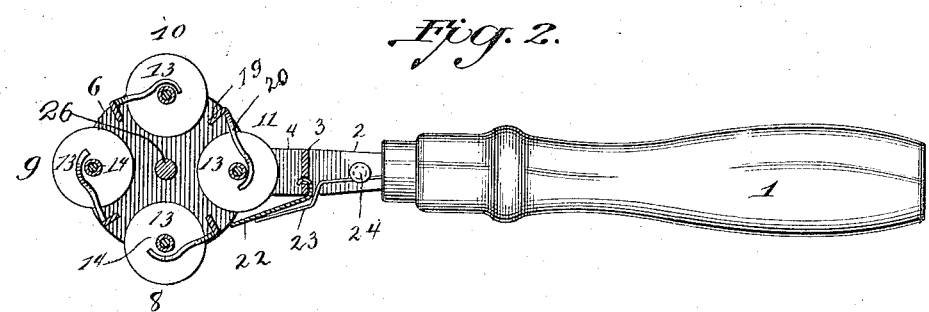
Figures 3, 4:
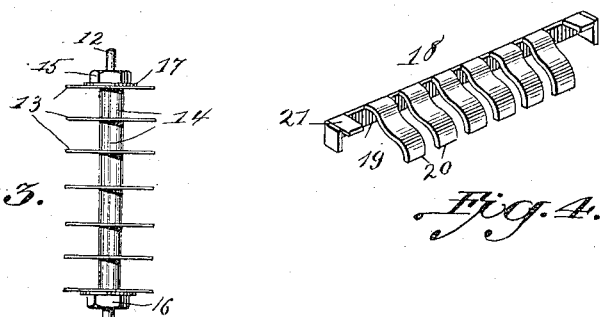

In the accompanying drawing: Figure 1 is a plan view of an implement embodying my invention. Fig. 2 is a transverse section taken through the cutter head and its frame. Fig. 3 is a plan view of one of the gangs of cutters. Fig. 4 is a perspective view of a stripper comb for a gang of cutters.

The implement comprises any suitable handle 1, a cutter frame consisting of a metal shank 2 and branches 3 extending at angles thereto and terminating in arms 4 and 5 extending forward in planes parallel with said shank.

The cutter head consists of a pair of, preferably, circular end plates 6 and 7, between which are secured (in the instance shown) four gangs of cutters marked 8, 9, 10 and 11, each gang consisting of a shaft 12 journaled at its ends in the end plates 6 and 7 near the periphery thereof, and having mounted thereon a plurality of steel cutter-disks 13 spaced apart by spacing sleeves 14, as best shown in Figs. 2 and 3. These disks and sleeves are locked firmly together by nuts 15 and 16 threaded onto the shaft 12, washers 17 being preferably interposed between the nuts and the outer disks as shown.

Stripper combs 18, comprising a base 19 and teeth 20, spaced apart just a sufficient distance to permit the cutter disks to rotate between them freely, the teeth of the respective combs being of a width slightly less than the length of the spacing sleeves 14 of the gang of cutters with which a comb will be used. The ends of the base 19 are suitably secured to the end plates 6 and 7, being preferably seated in radial kerfs cut in the peripheries of said plates, as shown, and fixedly secured in any suitable way. Adjacent the ends of each comb is a short tooth 21, Fig. 4, to overhang the clamping nuts 16. The cutter head thus organized is rotatively secured between the arms 4 and 5 of the cutter frame by a bolt 26 passing through central apertures in the end plates 6 and 7 and secured by nuts 27 and 28, the extreme ends of said bolt 26 being snugly but rotatively seated in circular apertures near the ends of said arms 4 and 5, all as shown in Figs. 1 and 2.

Loosely secured to the branches 3 of the cutter frame is a stripper apron 22, the forward edge of which is held in contact with the edges of the end plates 6 and 7 of the cutter head by a spring 23, that shown in the drawings consisting of a spring wire, one end of which is secured to the handle 1 adjacent the shank 21, the spring coil being supported on a stud 24 secured to the shank, and the forward free end of the spring bearing against the under side of the stripping apron, as clearly shown in Fig. 2.

A thumb screw 25 is seated in a threaded aperture in the arm 4 of the cutter frame, the end of said screw being designed to engage properly located sockets in the end plate 6 of the cutter head in order to lock any one of the respective gangs of cutters in the operative position shown by the gang 8 in Fig. 2.

In operation, when the desired gang of cutters 8 to 11 is locked in position by the thumb screw 25, the implement is thrust forward over a proper sheet of dough, and the ribbons formed by this action will be stripped from between the cutter blades by the teeth of the stripper comb of the cutter head, and directed back to the stripper apron of the cutter frame, which will deposit the severed ribbons or strips on the table or surface supporting the sheet of dough.

I claim:

1. A noodle cutter comprising a cutter frame and its handle, a rotatively adjustable cutter head embodying end plates and a plurality of gangs of rotary cutters mounted therebetween, each gang differing in gage from the others, and means engaging an end plate of the cutter head to lock said head with a selected one of the gangs of cutters in operative position.

2. A noodle cutter comprising a cutter frame and its handle, an adjustable cutter head embodying a plurality of gangs of cutters, each gang differing in gage from the others, a stripper comb for each gang, and means to lock the cutter head with any one of the gangs of cutters in operative position.

3. A noodle cutter comprising a cutter frame and its handle, an adjustable cutter head embodying a plurality of gangs of cutters, each gang differing in gage from the others, a stripper comb for each gang, a stripper apron secured to the cutter frame, and means to lock the cutter head with any one of the gangs of cutters in operative position.

4. A noodle cutter comprising a cutter frame and its handle, an adjustable cutter head embodying a plurality of gangs of cutters, each gang differing in gage from the others, a stripper comb for each gang, a spring pressed stripper apron secured to the cutter frame, and means to lock the cutter head with any one of the gangs of cutters in operative position.

In testimony whereof I affix my signature in presence of two witnesses.

CHARLES LOMBARDO.

Witnesses:
 JOSEPH N. PETRUZZI,
 SAMUEL PETRUZZI.

Copies of this patent may be obtained for five cents each, by addressing the "Commissioner of Patents, Washington, D. C."